Aug. 11, 1925.
H. V. HAIGHT
AIR LINE OILER
Filed Feb. 6, 1924
1,548,946
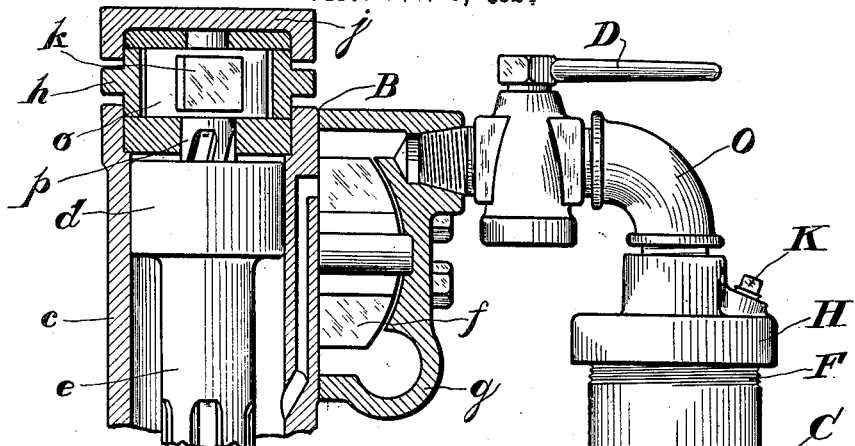
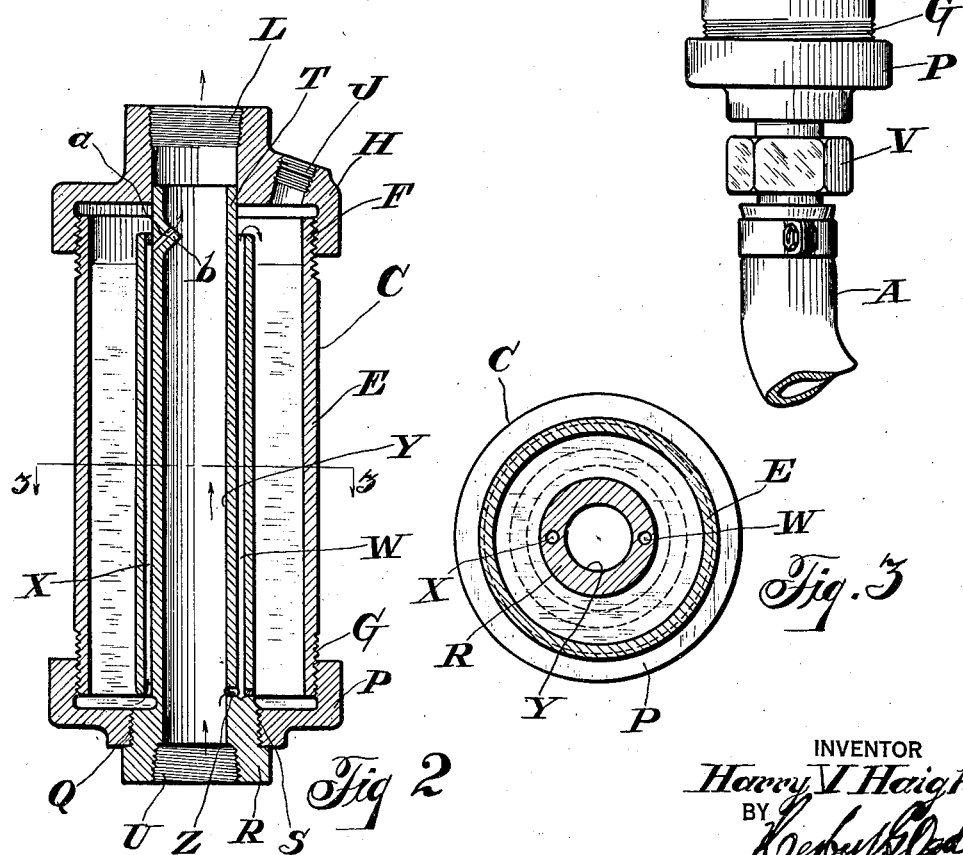
INVENTOR
Harry V Haight
BY
HIS ATTORNEY Patented Aug. 11, 1925.

1,548,946

UNITED STATES PATENT OFFICE.

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY.

AIR-LINE OILER.

Application filed February 6, 1924. Serial No. 690,987.

*To all whom it may concern:*

Be it known that I, HARRY V. HAIGHT, a citizen of the Dominion of Canada, and a resident of Sherbrooke, Province of Quebec, Canada, have invented a certain Air-Line Oiler, of which the following is a specification accompanied by drawings.

This invention relates to air line oilers but more particularly to an air line oiler adapted to be connected to an air line which may lead to fluid actuated machines such as rock drills, pneumatic tools, or other machines to which it is desired to automatically convey lubricant in small quantities for lubricating the working parts of the machine.

It is essential that fluid actuated machines receive sufficient lubricant to obtain smooth running yet not too great an amount of lubricant to cause a sluggish action. In rock drills which are operated to a great extent underground, lubrication becomes an important problem due more particularly to the inconvenience the miner is ordinarily put in obtaining lubricant with which to fill the reservoir which is usually formed as a part of the machine. Miners are often neglectful and as a result the machines run "dry" and serious injury to the working parts often occurs. In constructional work where many pneumatic tools, such as riveters and rotary drills, are used, the same problem is present and much time is lost in constantly supplying lubricant to maintain the machines running efficiently.

One object of this invention is to enable fluid actuated machines to receive sufficient lubricant through the medium of the pressure fluid employed to operate the machine by an improved and simplified air line oiler, which is cheap to manufacture, is composed of but few parts, and which will withstand the hard usage to which this type of oiler is ordinarily subjected.

Further objects of the invention will hereinafter appear, and the invention is shown in one of its preferred embodiments in the accompanying drawings in which, Figure 1 is a side elevation of an air line oiler connected to a rock drill, only the rear end portion being shown in vertical section, Figure 2 is an enlarged vertical sectional view of the air line oiler shown in Figure 1, and Figure 3 is a transverse section taken on the line 3—3 of Figure 2 looking in the direction of the arrows.

In the drawings, A designates an air line through which pressure fluid is adapted to pass, and which fluid in this instance serves as motive fluid for operating the rock drill B, only the rear end portion of which is shown. It is to be understood that the rock drill B is shown for illustrative purposes only, because this invention is applicable to any air line for the purpose of conveying a lubricant in small quantities therethrough. This invention contemplates the use of an air line oiler C which is adapted to be connected in substantially a vertical position to the air line A and through which elastic pressure fluid is adapted to pass. The air line oiler C is adapted to be filled with lubricant, and as pressure fluid passes through the air line a small portion of this pressure fluid is adapted to create pressure on top of the lubricant and due to the suction created by the pressure fluid passing from the oiler, lubricant will be drawn from the oiler through a small passage so that sufficient lubricant passes with the pressure fluid to lubricate the working parts of an elastic fluid actuated machine, in this instance the rock drill B, which is connected to one end of the air line A. A suitable throttle valve having an actuating handle D in this instance controls the flow of pressure fluid from the air line A to the rock drill B and is preferably positioned between the air line oiler C and the rock drill B so that when the handle D is actuated to shut off the flow of pressure fluid to the rock drill B, the flow of lubricant from the air line oiler C will be automatically shut off thereby preventing waste of lubricant.

Referring more particularly to the drawings, the air line oiler C in this instance comprises a tubular body portion or reservoir E which is preferably provided with screw threaded end portions F and G respectively. A cap H is in this instance adapted to be screwed onto the threaded end portion F and is preferably formed with a filling opening J closed by a suitable plug K for supplying lubricant to the body portion E. The cap H is preferably formed with a central screw threaded opening L to which an elbow O is in this instance connected. A cap P is preferably screwed onto the opposite threaded end portion G of the body portion E and is in this instance formed with a screw threaded opening Q.

A hollow conducting member R in this instance in the form of a tube is formed with external screw threads S which are adapted to be screwed into the screw threaded opening Q of the cap P, and the diameter of the opposite end of the conducting member R is in this instance reduced at T in order to extend a slight distance into the cap H. A screw threaded opening U is preferably formed in the conducting member R and a spud V is adapted to be screwed into the opening U for connecting one end of the oiler C to the air line A. Longitudinally extending passages W and X are in this instance formed in the conducting member R and are alternately arranged in such a manner that one end of the passage W communicates with the hollow bore Y of the conducting member R through a port Z and the corresponding end of the passage X communicates with the interior of the body portion E. The opposite end of the passage X communicates with the hollow bore Y through a port $a$ which in this instance is formed in a projection $b$ which is preferably inclined in the direction of the flow of pressure fluid through the conducting member R in order that a suction may be created in the port $a$ in order to withdraw lubricant from the body portion E as the pressure fluid from the air line flows through the conducting member R in one direction. At the same time a small portion of the pressure fluid will flow into the body portion E in order to create a slight amount of pressure upon the lubricant and prevent the creation of a vacuum therein. The air line oiler C may be inverted and in that event lubricant will be sucked out or withdrawn from the body portion E through the passage W and port Z and a small amount of pressure fluid will pass into the body portion E through the port $a$ and passage X but for the best results to be obtained the air line oiler C is mounted in a substantially vertical passage as shown in Figures 1 and 2 of the drawings.

In this instance, the air line oiler C is adapted to lubricate the working parts of the rock drill B which comprises a cylinder $c$ in which a piston $d$ having a forward fluted shank $e$ is adapted to reciprocate and motive fluid is distributed to the opposite ends of the piston $d$ by means of a suitable distributing valve $f$ mounted in the valve chest $g$. A ratchet ring $h$ is in this instance located between the back head $j$ and the cylinder $c$ and the pawls $k$ carried by the rifle bar head $o$ are adapted to cooperate with the teeth on the ratchet ring $h$ so that the spirally fluted lever bar $p$ will rotate only in one direction. As the piston $d$ reciprocates in the cylinder $c$ the rifle bar $p$ causes the piston to rotate in one direction, which rotation is transmitted through the usual chuck bushing for rotating the drill steel. As only a portion of a rock drill is shown in the drawings and as the above described arrangement of parts forms no part of the present invention, further description thereof is deemed unnecessary.

The above described air line oiler has been found to operate satisfactorily and efficiently and, as will be observed, is composed of but few parts, which enable it to be manufactured cheaply.

I claim:

1. An air line oiler comprising a cylindrical body portion adapted to be filled with lubricant, caps to seal the body portion, a hollow conducting member through which elastic pressure fluid is adapted to pass, connected at one end to one cap and supported at its other end within another cap, said member being formed with a pair of alternately arranged longitudinal passages adapted to connect the ends of said body portion with the opposite ends of said conducting member, whereby lubricant is drawn from said body portion by the elastic fluid as it passes in either direction through said conducting member.

2. An air line oiler comprising a tubular body portion open at both ends, a cap having a screw threaded opening and adapted to close one end of said body portion, a cap connected to the opposite end of said body portion, a tubular conducting member connected at one end to one of said caps and supported at its other end by the other cap and through which elastic pressure fluid is adapted to pass, said member being formed with a pair of longitudinally extending passages alternately arranged and communicating at one end with the interior of said body portion at one end of said body portion and the opposite end with the interior of said conducting member near the other end of said body portion, whereby lubricant is drawn from said body portion by the elastic pressure fluid as it passes through said conducting member.

3. An air line oiler comprising a tubular body portion open at both ends, a cap having a screw threaded opening and adapted to close one end of said body portion, a cap connected to the opposite end of said body portion, and a longitudinal tubular conducting member connected to one of said caps and through which elastic pressure fluid is adapted to pass, said member being formed with alternately arranged longitudinally extending passages, one end of one of said passages communicating with the interior of said body portion at one end of said body portion, and the corresponding end of the other passage communicating with the hollow bore of said conducting member and the other end of the first said passage communicating with the interior of the conducting member near the other end of said body portion and the corresponding end of the other said passage communicating with the interior of the body portion, whereby lubricant is drawn from said body portion as elastic fluid passes through said conducting member in either direction.

In testimony whereof I have signed this specification.

HARRY V. HAIGHT.